United States Patent [19]
Carlson

[11] Patent Number: 5,389,048
[45] Date of Patent: Feb. 14, 1995

[54] PARALLEL-AXIS DIFFERENTIAL WITH TRIPLET COMBINATION GEARS

[75] Inventor: Lennart S. Carlson, Rochester, N.Y.

[73] Assignee: Zexel-Gleason USA, Inc., Rochester, N.Y.

[21] Appl. No.: 36,444

[22] Filed: Mar. 24, 1993

[51] Int. Cl.⁶ .............................................. F16H 1/42
[52] U.S. Cl. ...................................... 475/252; 475/248
[58] Field of Search ................................ 475/248, 252

[56] References Cited

U.S. PATENT DOCUMENTS

| | | |
|---|---|---|
| 1,373,657 | 4/1921 | Finefrock . |
| 2,269,734 | 1/1942 | Powell . |
| 3,095,761 | 7/1963 | Hilado . |
| 3,292,456 | 12/1966 | Saari . |
| 3,706,239 | 12/1972 | Myers . |
| 3,738,192 | 6/1973 | Belansky . |
| 4,365,524 | 12/1982 | Dissett et al. . |
| 4,512,211 | 4/1985 | Stritzel . |
| 5,122,101 | 6/1992 | Tseng . |
| 5,147,252 | 9/1992 | Mace et al. . |
| 5,194,054 | 3/1993 | Amborn et al. ...................... 475/252 |
| 5,232,416 | 8/1993 | Amborn et al. ...................... 475/248 |
| 5,282,775 | 2/1994 | Teraoka ................................. 475/248 |
| 5,292,291 | 3/1994 | Ostertag ............................... 475/252 |

FOREIGN PATENT DOCUMENTS

| | | |
|---|---|---|
| 0356401 | 2/1990 | European Pat. Off. . |
| 700661 | 12/1940 | Germany . |
| 4013196 | 10/1991 | Germany . |
| 4023332 | 12/1992 | Germany . |

Primary Examiner—John T. Kwon
Attorney, Agent, or Firm—Eugene Stephens & Associates

[57] ABSTRACT

The preferred embodiments of the invention disclose an automotive torque-proportioning differential of the parallel-axis type having two planetary sets of either three or four combination gears in mesh with sun/side gears that receive respective vehicle axle ends. Each respective combination gear in each set is in meshing engagement with both (a) a respective one of the differential's two sun gears and (b) at least one other combination gear of its set. As compared with the planetary gearing of conventional differentials of similar size and torque-proportioning characteristics, the widely-separated sets of planetary gears occupy remarkably less interior space in the housing, permitting (i) the use of unconventionally large housing windows that significantly reduce the weight of the differential and greatly facilitate lubrication of the differential's gearing, and/or (ii) accommodation of C-clip assembly for the axle ends without increasing the exterior dimensions of the differential. In one embodiment, the center combination gear of each planetary set is designed with a larger diameter than the respective diameters of the two outer combination gears of the set.

12 Claims, 8 Drawing Sheets

FIG. 8

PARALLEL-AXIS DIFFERENTIAL WITH TRIPLET COMBINATION GEARS

TECHNICAL FIELD

The invention relates to torque-proportioning type automotive differentials having planetary gear arrangements carried within housings that are rotatable about a pair of drive axles interconnected by the planetary gear arrangements.

BACKGROUND OF INVENTION

Gear differentials generally include compound planetary gear sets interconnecting a pair of drive axles to permit the latter to rotate in opposite directions with respect to a differential housing. The drive axles rotate about a common axis; and a pair of respective sun gears (sometimes called "side" gears) are fixed for rotation with the inner ends of the two drive axles, such gears acting as the sun gear members of the compound planetary gear sets. The sun gears are interconnected by so-called "element" or "combination" gears, which form the planet gear members of the sets. The planet gears are usually arranged as sets of meshing pairs, being spaced circumferentially and equidistant about the common axis of the sun gears (e.g., four pairs arranged at 90° intervals or three pairs at 120° intervals); and the planet gears may be mounted for rotation about axes that are variously offset and inclined with respect to a common axis of the sun gears and drive shafts. My invention relates primarily to, but is not limited to, "parallel-axis" differentials in which the planet gears are mounted on axes parallel to the common axis of the sun gears.

The entire planetary gearing arrangement within the differential housing supports opposite relative rotation between the drive axle ends (i.e., differentiation), which is necessary to permit the axle ends to be driven at different speeds. Torque transmitted to the drive axles through the inclined tooth surfaces of the sun/side gears generates thrust forces against gear-mounting bearing surfaces within the differential. (Such bearing surfaces may comprise journals formed in the housing, or may be the ends of bores into which the gears are received, or may be special washers positioned between the end faces or shaft ends of the gears and the housing.) The thrust forces, together with other loads conveyed by the gear meshes in the planetary gearing, produce a frictional resistance to relative rotation between the drive axles, this frictional resistance being proportional to the torque applied to the differential housing. The proportional frictional resistance supports different amounts of torque between the two drive axles to prevent their relative rotation until the characteristic "bias" ratio of the planetary gearing arrangement is reached. Once the frictional resistance is overcome and differentiation begins, the torque difference between the axles is proportioned in accordance with the bias ratio. Differentials that divide torque in a substantially constant ratio between relatively rotating drive axles, are referred to as "torque-proportioning" differentials.

The ability to support different amounts of torque between the drive axles is of great benefit to improving traction capabilities of vehicles. Ordinarily, when one wheel of a vehicle with a conventional differential loses traction, the amount of torque that can be delivered to the other drive wheel is similarly reduced. However, when one wheel loses traction so that there is differentiation between the two axles, torque-proportioning differentials deliver an increased amount of torque to the drive wheel having better traction, such increased torque being determined by the characteristic bias ratio of the differential.

In typical parallel-axis torque-proportioning differentials (e.g., U.S. Pat. No. 2,269,734 to L. S. Powell and U.S. Pat. No. 3,706,239 to A. F. Myers), each planet gear is in mesh with a paired planet gear, and each planet gear in the pair meshes, respectively, with one of the sun gears; and one axial end of each individual planet gear is in mesh with its respective side gear, while its other axial end is in mesh with its paired planet gear. This common form of planetary gear is also used in those parallel-axis differentials which, instead of pairs of planetary gears, mount the planetary gears in a continuous circular mesh around the full circumference of each respective side gear (e.g., U.S. Pat. No. 3,292,456 to O. E. Saari and U.S. Pat. No. 3,738,192 to R. J. Belansky). That is, in most parallel-axis torque-proportioning differentials, the planetary gear pairs mesh with each other at only one of their axial ends, and their respective loads are often carried primarily by only one end of their axial mounting supports.

In general, the helical-tooth planetary gears used in parallel-axis type differentials are usually simpler to manufacture than are the relatively complex planetary gears (which combine spur and worm teeth) used in torque-proportioning designs of orthogonal-axis type differentials. (See U.S. Pat. No. 1,373,657 to J. A. Finefrock.) However, when the latter are made with the same number of sun and planet elements as the former, they usually develop greater frictional resistance between their respective gear meshes and support bearings; and this, in turn, provides greater torque bias and/or increased control over the bias ratio. That is, parallel-axis differentials usually provide relatively lower torque bias and less control over bias ratios.

Torque-proportioning differential arrangements are also used to divide engine torque between the front and rear axles of 4-wheel drive vehicles. In such an inter-axle arrangement, often referred to as a "center-box", the output gears (i.e., sun/side gears) are fixed to the respective drive shafts for each axle. In addition to delivering an increased amount of torque to the axle having better traction, such center-box differentials are sometimes designed with differently-sized output/sun gears to split the relative amount of engine torque being delivered to the front and rear axles (e.g., 60% to rear and 40% to front). In such arrangements, special accommodation is made in order to have the planetary gear sets mesh with each other to interconnect the differently-sized sun/output gears. In two known center-box designs, such accommodation is accomplished by arranging the planetary gears into four or more triplet sets, with the center gear of each set being in mesh with one output/sun gear, and the two outer gears of each triplet set being in mesh with the other differently-sized sun/output gear. In one of these latter center-box arrangements (disclosed in German Application DE 40 23 332), the center gear in each of four triplet sets meshes with the larger output/sun gear, while in the other arrangement (shown in U.S. Pat. No. 5,147,252 to Mace et al.), the outer planetary gears in each of five triplet sets meshes with the larger output/sun gear.

Also, one parallel-axis differential of more recent design (U.S. Pat. No. 5,122,101 to G. B. Tseng), provides such differentials with an increase in frictional surfaces and greater control over bias ratio. In this recent design, the paired planetary gears of each circumferentially-spaced set mesh with each other at two separated areas of engagement. That is, each combination gear of the pair is in mesh with a respective one of the side gears, and each shares two separate and distinct meshing areas with its paired combination gear. For each combination gear, the two meshing portions shared with its paired gear "straddle" the portion of the gear which is in mesh with its respective side gear. Preferably, the shared mesh portions are located at the two axial outer ends of the combination gears. This arrangement also improves the load balance on the planetary gear mounting supports.

In regard to one of the features of the invention, a significant portion of automobiles presently being manufactured throughout the world use so-called "C-clips" for assuring that the axle ends cannot be accidentally withdrawn from the differential (see U.S. Pat. No. 4,512,211 to G. A. Stritzel). In this well-known type of assembly, C-shaped (i.e., partial ring) fasteners are fitted within annular grooves formed near the axle ends after the latter have been inserted through respective journals formed in the differential housing and through a respective one of the sun/side gears.

In order to complete this C-clip assembly, it is necessary to provide space for some relative motion between each axle end and the differential housing so that each axle end can be inserted within the differential case for a sufficient distance to expose the locking ring groove formed in the axle end. Once the C-clip locking ring is installed in place, the axle part is then withdrawn to a desired position for normal driving operation. After this has been done for each respective axle part, it is necessary to insert some means for preventing further axial movement of the axles to maintain them and their respectively captured C-clips in the desired position.

One known prior art reference (U.S. Pat. No. 4,365,524 issued to Dissett et al.) discloses a torque-proportioning parallel-axis differential designed to accommodate C-clip assembly. However, the Dissett differential includes only two sets of planet gear pairs and, as indicated above, such relatively fewer gears provide relatively lower torque bias and less control over bias ratios.

This lack of accommodation for C-clip assembly is apparently due to the relatively lower bias ratios available with parallel-axis designs. Namely, C-clip assembly requires that sufficient space be available within the differential housing to permit the insertion and attachment of the C-clips to the axle ends; and this space requirement can only be met with existing higher-bias parallel-axis designs by the removal of at least one set of the differential's planetary gear pairs. Known designs of parallel-axis differentials cannot afford to lose such a gear set. That is, the loss of such planetary gearing (and the thrust forces and frictional resistance produced by the removed gear meshes) would reduce the differential's available bias ratios below the levels specified for its appropriately practical torque-proportioning use.

Of course, known designs could be significantly enlarged to provide the space requirements of C-clip assembly between existing planetary gear sets, but such enlargement would not be acceptable to the automotive industry which places high priority on space and weight reduction.

My invention overcomes these problems and improves parallel-axis differential design (a) by accommodating C-clip assembly without significant increase in differential size and weight, and/or (b) by providing significant weight reduction and improved lubrication; and it accomplishes these improvements without significantly modifying the differential's torque bias specifications.

SUMMARY OF THE INVENTION

A parallel-axis torque-proportioning differential according to my invention has a generally cylindrical housing for supporting a pair of sun/side gears adapted to receive respective axle ends for rotation about a common axis. Preferably, only two sets of planetary combination gears are positioned circumferentially about the common axis of the sun gears, and these planetary sets are preferably located 180° apart. Each planetary set has only three or four combination gears, and each respective combination gear in each set is in meshing engagement with both a respective one of the differential's two sun gears and with at least one other combination gear of its set.

The two planetary sets are arranged similarly. Namely, the axes of the three combination gears are all aligned in parallel with each other; and the combination gears of each set are alternately in meshing engagement with opposite ones of said sun gears and are also in mesh with at least one other combination gear of the same set. Where each set includes only three combination gears: The one center combination gear of each triplet set is in meshing engagement with each of the other two combination gears of its set, the latter two gears being referred to as "outer" combination gears; the two outer gears of a first one of the sets are in mesh with a first one of the sun gears, while the one center combination gear of that same first set is in mesh with the second sun gear; and in the second planetary set, the two outer combination gears are in mesh with the second sun gear, while the one center combination gear of the second set is in mesh with the first sun gear.

Where each planetary set includes only four combination gears: The two center combination gears are in mesh with each other and, respectively, with either the first or the second sun gear; and each is also in mesh with its adjacent outer combination gear. In the embodiments of my invention having four-gear planetary sets, the four combination gears are positioned and operate substantially in the same manner as the three-gear sets. Therefore, it should be understood that, unless otherwise indicated by the context of the specification, the term "triplet" is intended to refer in most instances to both three-gear and four-gear arrangements.

In the preferred embodiments disclosed herein, all of the combination gears are of the recent straddle design (referred to above in the Background section) in order to provide greater control over bias ratio and a more balanced loading of the combination gears. That is, each combination gear meshes with its related combination gear(s) at two separated areas that straddle the position where each combination gear meshes with its respective sun gear.

The invention's two sets of triplet planetary gears are mounted within a differential housing having exterior dimensions substantially identical to those presently being used for comparable prior art parallel-axis designs referred to in the Background section above. Further, with this novel configuration, the two planetary sets of my invention have the same number of combination gears (six or eight) as a typical prior art differential using three or four planetary sets of paired combination gears. Therefore, since my two triplet sets have the same number of gear meshes and generate substantially the same total thrust forces, they can provide comparable frictional resistance to relative rotation between the drive axles, thereby providing comparable bias ratios and comparable exterior dimensions in a format that has important commercial advantages.

In all embodiments of my invention, each of the planetary triplet sets (whether including three or four combination gears) is secured to the housing by a similar pedestal that, in preferred embodiments, is configured with a plurality of interconnected bores for receiving and supporting its respective combination gears. Also, portions of each pedestal serve as pilot surfaces for facilitating assembly of the two sun gears into the differential housing.

In a first preferred embodiment, each pedestal is generally configured in the form of a truncated sector of the cylindrical housing, the axis of which is the common axis of the sun gears; and the surfaces of the truncated portions of both sectors cooperate to form the pilot surfaces for sun gear assembly. With this first preferred arrangement, each support sector occupies only slightly more than one-quarter of the cylindrical surface of the housing; and therefore, relatively large windows can be formed in the remaining surface (nearly-half) of the housing cylinder to achieve significant weight reductions and to greatly facilitate lubrication.

In a second preferred embodiment, the extra space achieved with my triplet design is utilized to accommodate C-clip assembly. In this further embodiment, each pedestal is expanded slightly from the truncated sector shape discussed above into a segmental shape, and this additional mounting surface is used to support and pilot a two-element spacer block that maintains the sun gears and axle ends in the desired operating position and, in addition, facilitates C-clip assembly. The first element of the spacer block, a gear-spacer element, is fixed between the two pedestals and serves to maintain the sun gears in position during shipment and prior to assembly into a vehicle, as well as during C-clip assembly operations. This gear-spacer element has a bifurcated end that permits the axle ends to be passed through the sun gears during assembly.

A second, axle-spacer element cooperates with the gear-spacer element so that, when finally assembled, the gear- and axle-spacer elements interlock to form an integrated spacer block that is positioned between the sun gears and between the axle ends. The axle-spacer element is removably positioned in a small window through the housing, and it is removed to facilitate C-clip assembly. That is, when the second spacer element is removed, the small window in the housing provides access to the area between the sun gears so that (a) the axle ends can be serially inserted through their respective sun gears, (b) a respective C-clip can be placed on each axle end, and (c) each respective axle end can then be withdrawn to its preferred operating position. The axle-spacer element is then reinserted through the small housing window and pinned in place for preventing further axial movement of the axles and, thereby, maintaining the axle ends and their respectively captured C-clips in the desired position. The inner end of the axle-spacer element is configured to mate with the bifurcated inner end of the gear-spacer element to form the integrated spacer block referred to above.

In a further embodiment of the invention, the center combination gear of each three-gear planetary set is designed with a larger diameter than the respective diameters of the two outer combination gears of the set so that the center distance between each center combination gear and its respective meshing side gear is larger than the center distances between the two outer combination gears of each set and their respective meshing side gears. With this arrangement, it is possible to vary and adjust the radial forces generated between the sets of planetary gears and the sun/side gears, thereby providing additional control over imbalanced separation forces between the sun and planet gears.

DRAWINGS

FIGS. 1 and 2 are respective cross-sectional views of a torque-proportioning differential according to the invention, FIG. 1 being taken along the line 1—1 of FIG. 2, while FIG. 2 is taken along the line 2—2 of FIG. 1.

FIGS. 4 and 5 are cross-sectional views of a second preferred embodiment of a differential according to the invention, this embodiment being modified to accommodate C-clip assembly. FIG. 4 is taken along line 4—4 in FIG. 5, while FIG. 5 is taken along line 5—5 in FIG. 4.

DETAILED DESCRIPTION OF PREFERRED EMBODIMENTS

Figure 1:
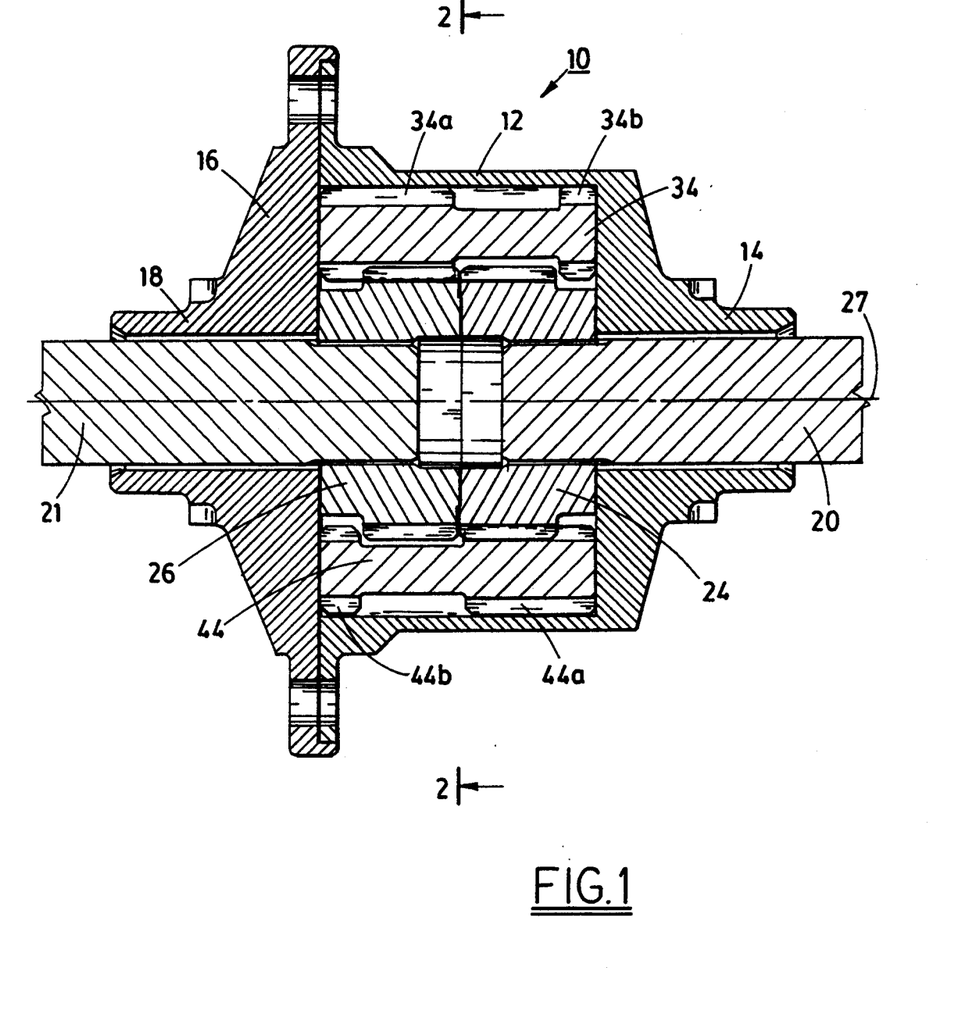
Figure 2:
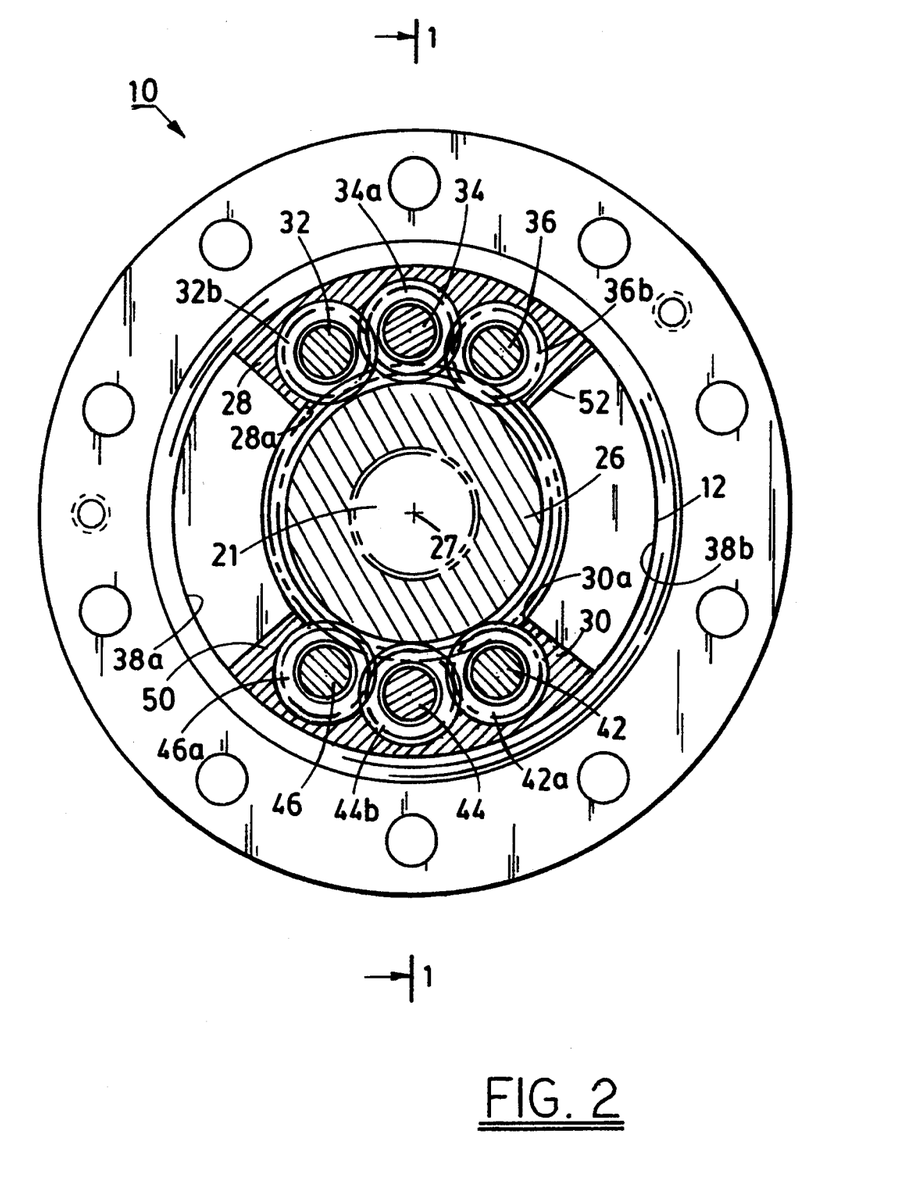
Figure 3:
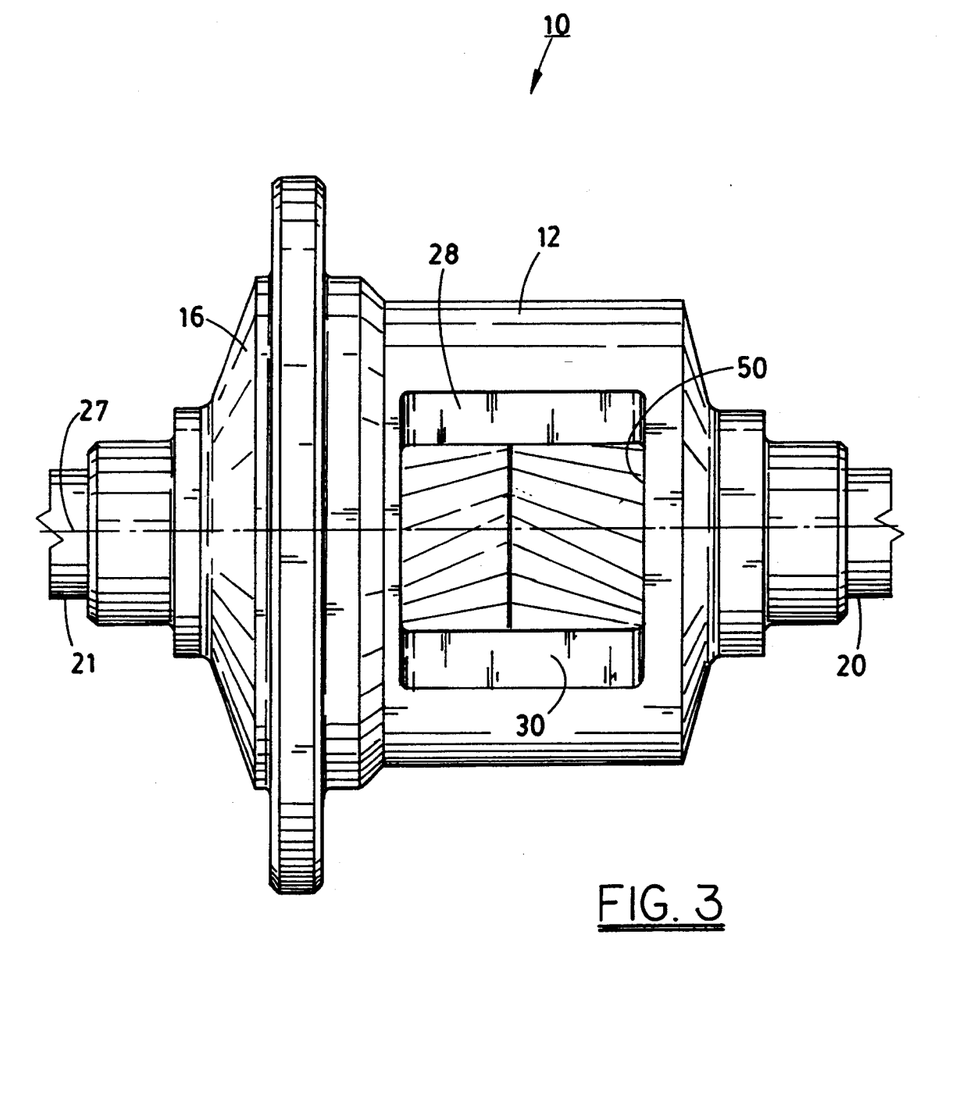
FIG. 3 is an exterior view of the housing of the differential as shown in FIG. 1, the planetary gearing arrangement being omitted.

Referring to FIGS. 1, 2, and 3, a differential 10 includes a housing with a cylindrical central portion 12 formed with a journal 14 at one end and an opening at the other end, the opening being closed by a flanged cover 16 that includes a second journal 18.

A pair of axle ends 20, 21 are positioned in respective journals 14, 18 being suitably splined into respective sun gears 24, 26 for rotation about a common axis 27. A pair of pedestals 28, 30 are fixed to the interior of housing 12, each pedestal 28, 30 being configured with a plurality of interconnected bores for receiving and supporting respective triplet sets of combination gears 32, 34, 36 and 42, 44, 46.

To facilitate explanation and simplify discussion of the planetary gearing arrangements, the following convention will be used to identify the various gears. Of the two sun gears, gear 26 is closest to flanged cover 16, and it will be identified as the "bottom" sun gear, while sun gear 24 will be identified as the "top" sun gear. Each combination gear will be characterized by the sun gear with which it meshes, i.e., a top combination gear meshes with top sun gear 24, while a bottom combination gear meshes with bottom sun gear 26.

In the triplet set supported by pedestal 28, center gear 34 is a bottom combination gear, and its two mating gears 32, 36 are top combination gears. Conversely, in pedestal 30, center gear 44 is a top combination gear, while its mating gears 42, 46 are bottom combination gears.

Each combination gear 32, 34, 36, and 42, 44, 46 has two separated meshing areas. As can best be seen in FIG. 1, the left end of gear 34 and the right end of gear 44 have longer meshing areas 34a, 44a, respectively; and the opposite ends of each gear have respective shorter meshing areas 34b and 44b. The meshing portions of the two outer combination gears of each triplet set are similar but reversed.

The longer meshing area of each combination gear is in mesh with both its related sun gear and with at least one of the other combination gears of its respective triplet, and its shorter meshing area is also in mesh with the same other combination gear so that the meshing areas shared by related combination gears straddle the position where each combination gear meshes with a respective one of the sun gears. That is, larger meshing portion 34a of bottom combination gear 34 meshes with bottom sun gear 26 and with shorter meshing areas 32b and 36b of its respective related top combination gears 32, 36; while shorter meshing area 44b of top combination gear 44 meshes with the longer meshing areas 42a, 46a of its two related bottom combination gears 42, 46, and longer meshing areas 42a, 46a are also in mesh with bottom sun gear 26.

While the just-described triplet sets of combination gears have been disclosed as a straddle design, these planetary arrangements can also be designed in more conventional form with the combination gears having only a single meshing engagement with each other. However, no matter what design is used for the planetary gears, the three- or four-gear planetary arrangements of this invention provide the same number of gear meshes and generate substantially the same total thrust forces as are generated by a conventional parallel-axis torque-proportioning differential utilizing three or four sets of paired combination gears. Therefore, my two triplet sets can provide the same frictional resistance to rotation as a conventional parallel-axis torque-proportioning differential, thereby achieving comparable bias ratios and maintaining comparable exterior dimensions. At the same time, my new format uses remarkably less interior space of the housing, an arrangement that provides significant and valuable commercial advantages.

As can best be seen in FIG. 2, pedestals 28, 30 are configured as truncated sectors of a cylinder formed about common axis 27, and their respective truncated surfaces 28a, 30a act as pilot surfaces for facilitating assembly of sun gears 24, 26 into their desired positions in the differential's planetary gearing arrangement.

Support structures 28, 30 each require only about one-quarter of the interior surface of cylindrical portion 12 of the housing, leaving two large separated areas 38a, 38b of housing portion 12 open, and thereby providing one of the important advantages of my novel design.

With specific reference to FIGS. 2 and 3, cylindrical central portion 12 of the housing has two large windows 50 and 52 formed therein. These windows occupy a large percentage of separated areas 38a, 38b; and, because of the reduced amount of space taken by my triplet planetary gear arrangements, the size of windows 50, 52 can be made significantly larger than the housing openings that can be provided in similarly-sized housings with conventional parallel-axis arrangements. These remarkably large windows significantly reduce the weight of the differential, and they greatly facilitate lubrication of the differential's gearing.

In a second preferred embodiment of my invention, the extra space achieved with my triplet design is utilized to accommodate C-clip assembly. This further embodiment is disclosed in FIGS. 4, 5, and 6.

Figure 5:
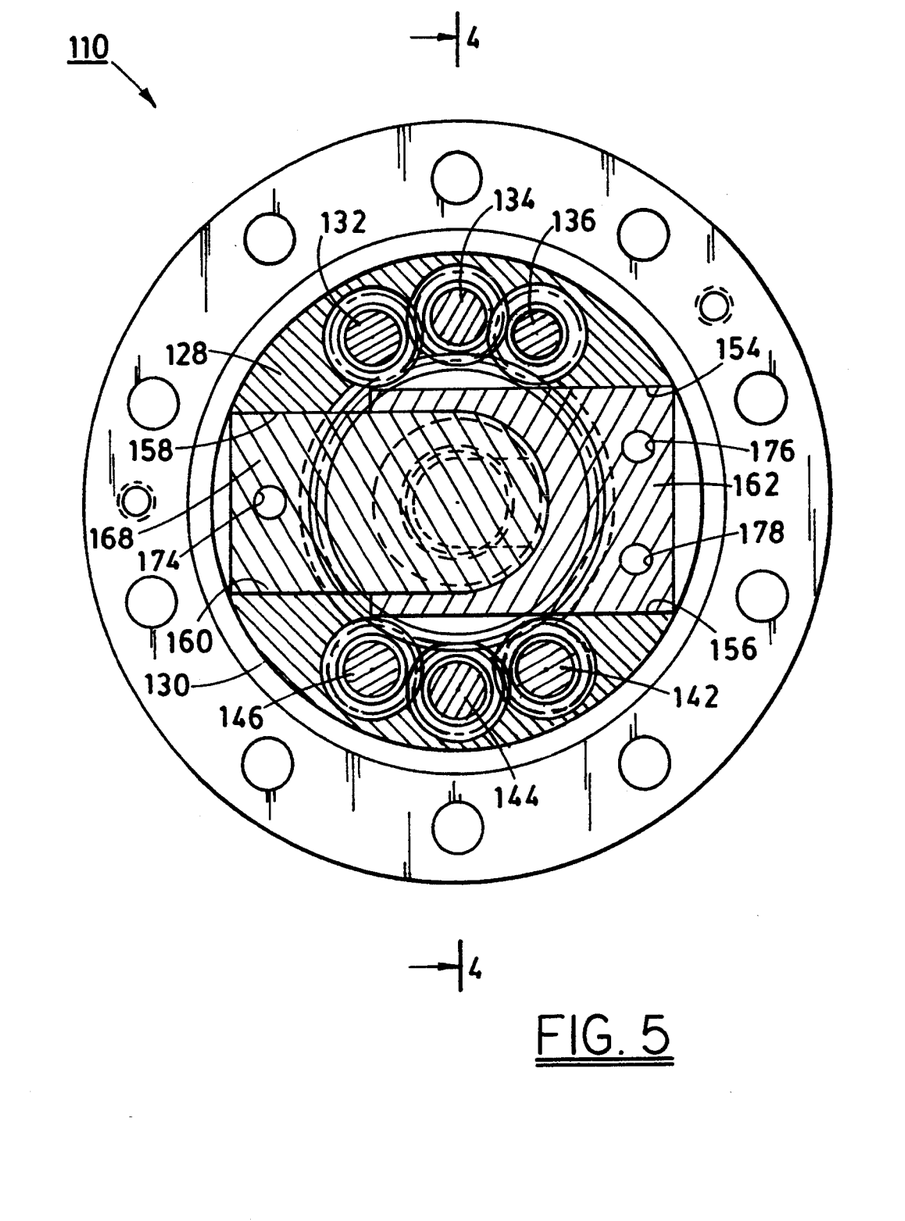
Figure 6:
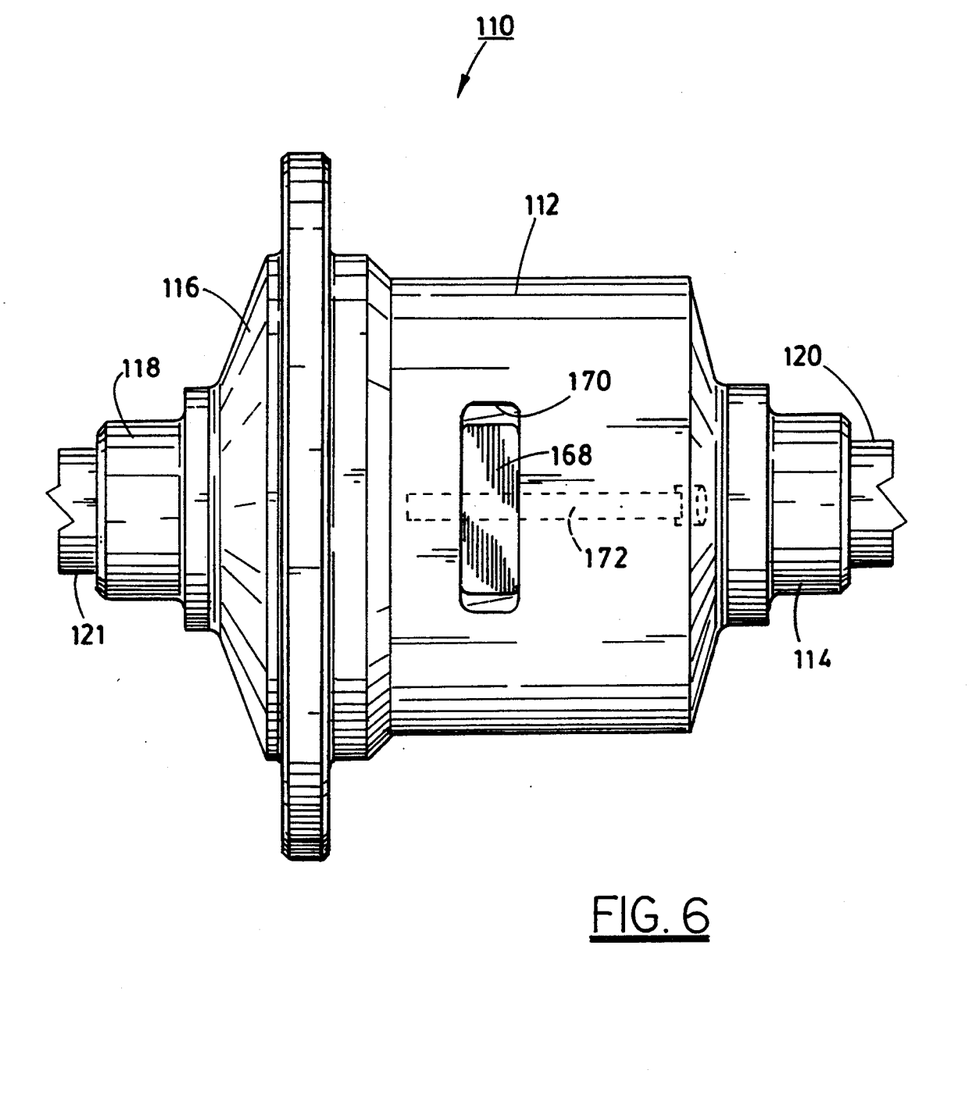
FIG. 6 is an exterior view of the housing of the differential as shown in FIG. 4, omitting the planetary gear arrangement.

As best seen in FIG. 5, each pedestal 128, 130 is expanded slightly (relative to the truncated sector shape discussed above) into a segmental shape that includes two additional mounting surfaces, namely, surfaces 154, 156 and 158, 160, respectively, which are used to support and pilot a two-element spacer block that maintains the sun gears and axle ends in the desired operating position and, in addition, facilitates C-clip assembly.

The first element of the spacer block, gear-spacer element 162, is fixed between respective mounting surfaces 154 and 156 of triplet pedestals 128 and 130. As can best be seen in FIG. 4, gear-spacer element 162 fits between sun gears 124, 126 and serves to maintain the sun gears in their respective positions (i) during shipment and prior to assembly into a vehicle, as well as (ii) during C-clip assembly operations. The left end of gear-spacer element 162 (as viewed in FIG. 5) has a bifurcated shape that provides clearance for the ends of axles 120, 121, allowing them to be moved axially through their respective sun gears 124, 126 during assembly to permit attachment of respective C-clips 164, 166.

Figure 4:
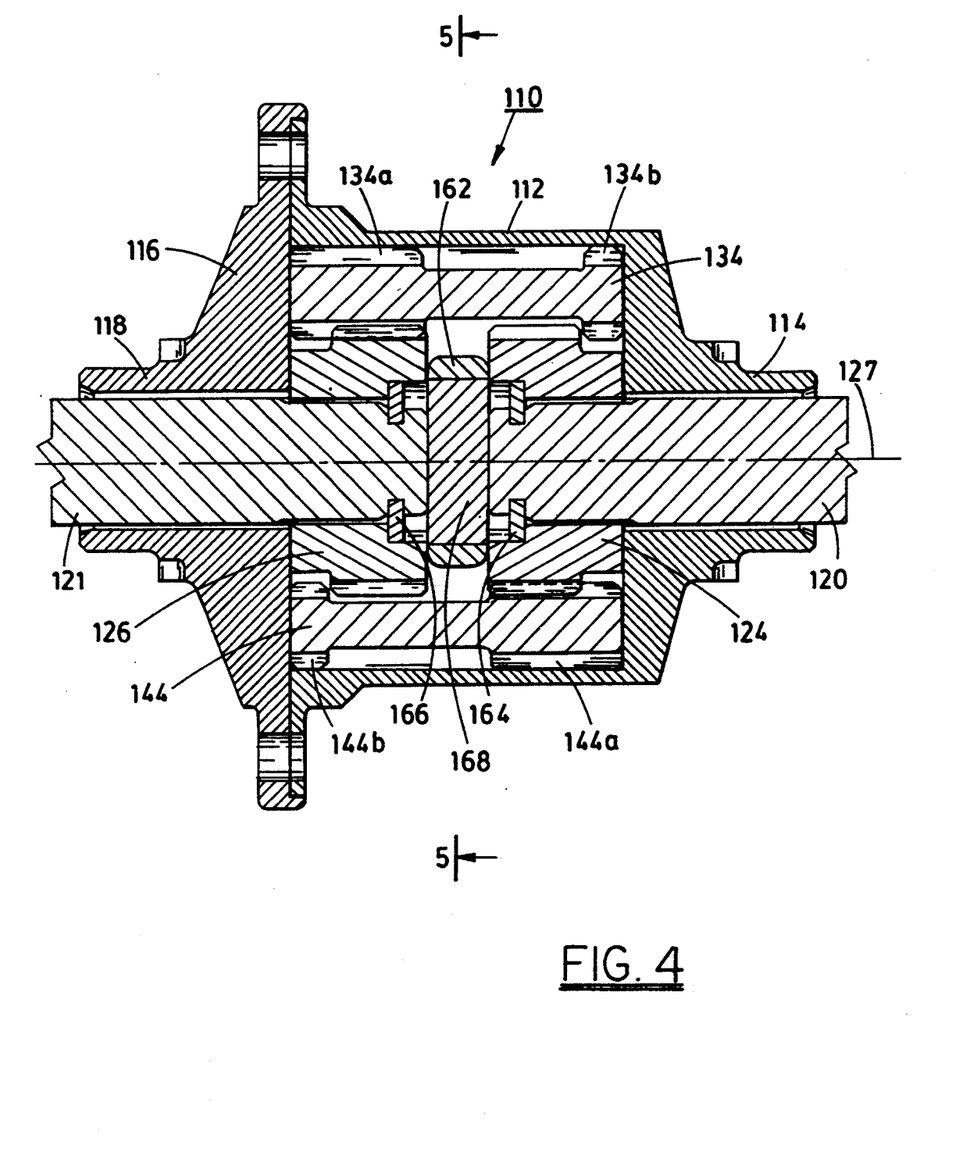

An axle-spacer element 168 cooperates with gear-spacer element 162 to form an integrated spacer block that is positioned (i) between sun gears 124, 126 and (ii) between axle ends 120, 121 when the differential is finally assembled. Axle-spacer element 168 is removably positioned in a small access window 170 through central portion 112 of the housing, and it is removed to facilitate C-clip assembly in the usual manner well known in the art.

Such C-clip assembly is accomplished as follows: When axle-spacer element 168 is removed, access window 170 provides access to the area between sun gears 124, 126 so that (a) axle ends 120, 121 can be serially inserted through their respective journals 114, 118 and their respective sun gears 124, 126; (b) C-clips 164, 166 can be placed on each respective axle end 120, 121; and (c) each respective axle end can then be withdrawn to its preferred operating position as shown in FIG. 4. Axle-spacer element 168 is then reinserted through access window 170 and locked in place in housing 112 with an appropriate pin 172 that is received through a pilot hole 174. As can be seen best in FIG. 5, the inner end of axle-spacer element 168 is configured to mate with the bifurcated left end of gear-spacer element 162 to form the integrated spacer block referred to above.

Gear-spacer element 162 is also appropriately locked in place in housing 112 by two more pins (not shown) that are received, respectively, through pilot holes 176, 178. This arrangement enhances the stability of the spacer block assembly which, as indicated above, now maintains the axle ends and their respectively captured C-clips in their desired operating positions.

Once again, it should be noted that my invention permits such C-clip assembly in a parallel-axis differential format that requires no more space in an automotive drive train than does a conventional parallel-axis differential, while providing torque-proportioning bias ratios comparable to those achieved by conventional designs whose three or four sets of planetary gearing prevent such C-clip assembly.

In both of the preferred embodiments just described above, the three planetary combination gears of each planetary set are of equal size. While this is preferred, it is not necessary. For instance, in another embodiment of my invention, shown schematically in FIG. 7, the design of my planetary gearing is modified by providing a larger diameter for the center gear of each triplet. In each set, the outer gears 232, 236 and 242, 246 have identical diameters; and they roll in mesh with an enlarged center gear 234, 244 about the circumference of the differential's sun/side gears 226. With the exception of the different diameters of the planetary gears in this modification of my invention, the construction and arrangement of the sun and planetary gears are exactly as those shown and described above with reference to the previously described embodiments.

Figure 7:
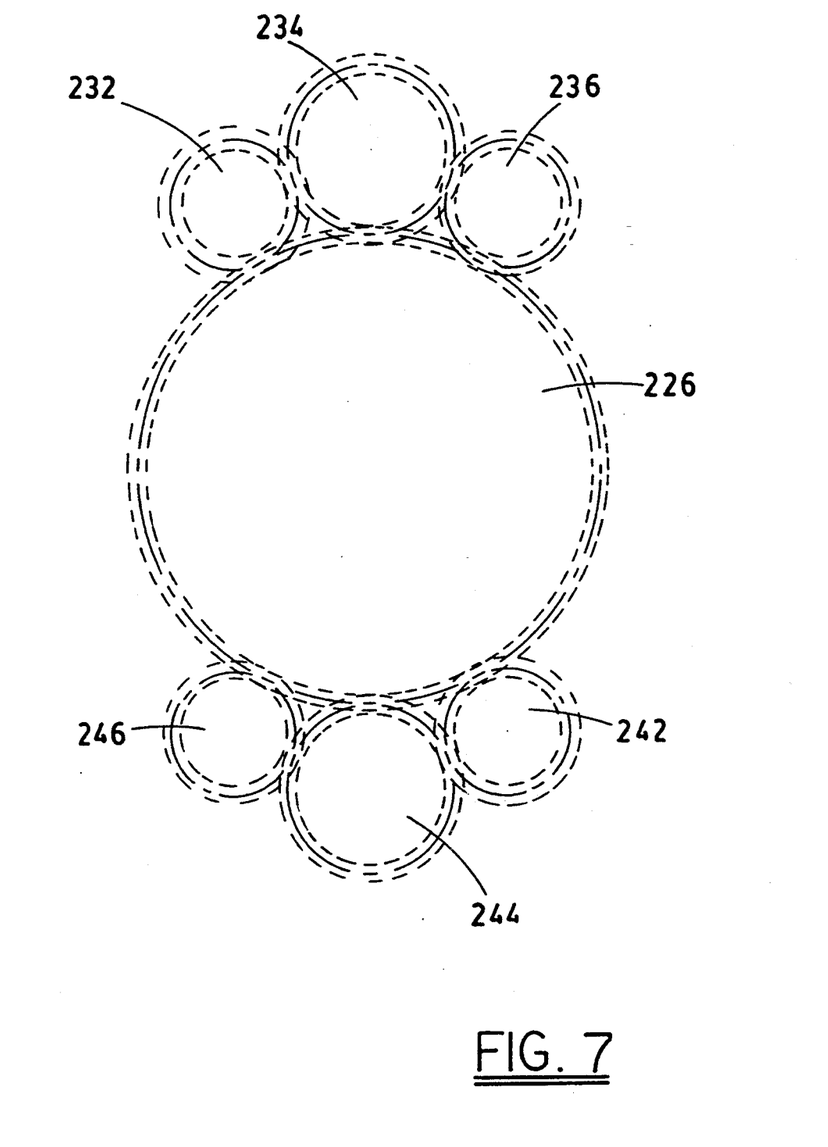
FIG. 7 is a schematic cross-sectional view of the sun and planet gears of a further embodiment of the invention.

With the larger diameter of the center combination gear, the center distance between each center combination gear and its respective meshing side gear is larger than the center distances between the two outer combination gears of each set and their respective meshing side gears. This results in an increase in the transverse pressure angle between the meshing teeth of the center planetary gear and its mating sun gear, providing a larger separating force between these two gears in opposition to the combined separation forces being exerted by the outer planetary gears and their respective sun gear.

Therefore, this latter embodiment of the invention may be utilized in those instances where additional control over the separation forces between the sun and planet gears is desired. That is, by selecting different variations of this modified arrangement, it is possible to vary and adjust the radial forces generated between the sets of planetary gears and the sun/side gears, thereby providing such desired additional control.

Figure 8:
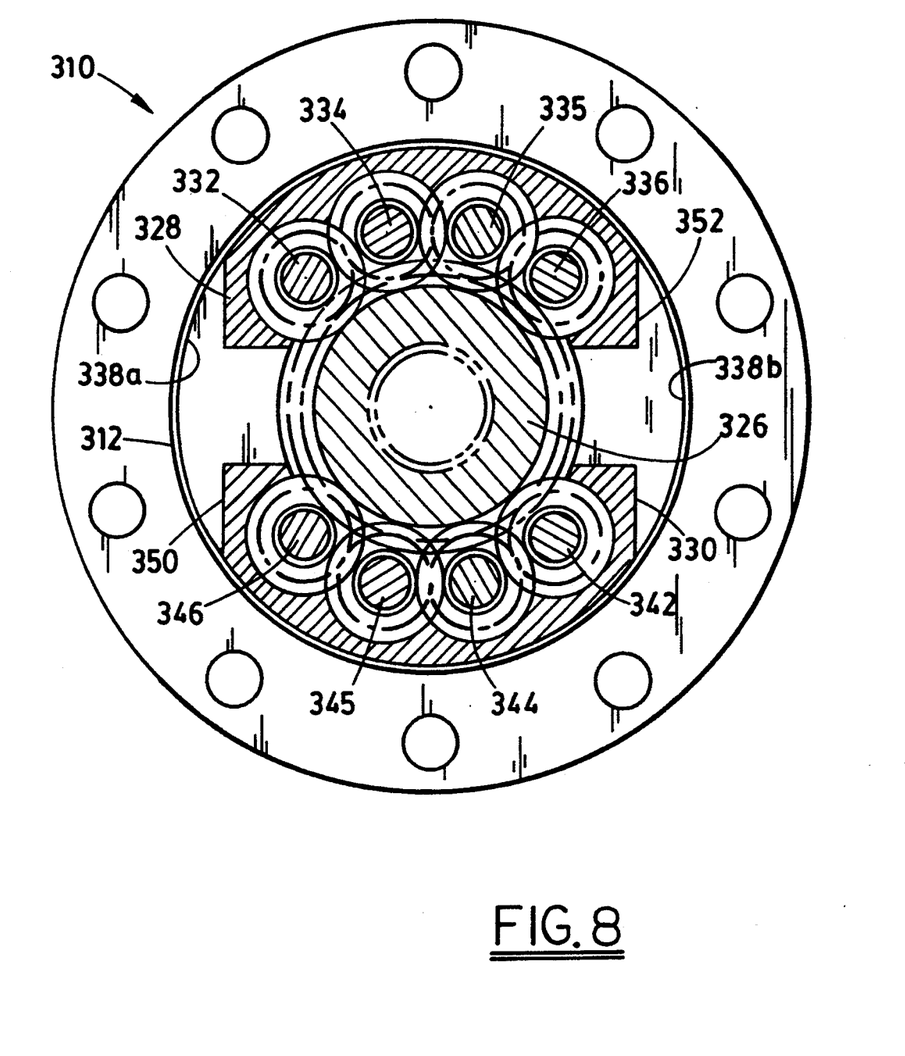
FIG. 8 is a cross-sectional view of the alternative four-gear planetary arrangements which can be substituted for the three-gear arrangements shown in FIGS. 1 through 6, this view being similar to the view shown in FIG. 2 relating to the first embodiment.

Finally, FIG. 8 is a cross-sectional view of alternative four-gear planetary arrangements which can be substituted for the three-gear arrangements shown in FIGS. 1 through 6. It will be noted that this alternative embodiment is almost identical to the embodiment shown in FIGS. 1, 2, and 3, except that the three-gear sets of planetary combination gears are replaced with four-gear sets. The view in FIG. 8 is similar to that shown in FIG. 2.

The pedestals 328 and 330 have been modified slightly to support respective four-gear sets, namely, combination gears 332, 334, 335, 336 and 342, 344, 345, 346. Combination gears 332, 336 and 342, 346 are outside gears, while combination gears 334, 335 and 344, 345 are center gears, and all are similar to those described above, each having a straddle design with (i) a longer meshing area in mesh with one mating combination gear of its set as well as with a respective one of the differential's sun/side gears and (ii) a shorter meshing area which also meshes with its same mating combination gear.

The combination gears of each set are alternately in meshing engagement with opposite ones of the sun/side gears so that, in the illustrated embodiment, combination gears 332 and 335 are in mesh with bottom sun gear 326, while combination gears 334 and 336 are in mesh with the top sun gear (not shown). Similarly, combination gears 342 and 345 are also in mesh with bottom sun gear 326, while combination gears 344 and 346 mesh with the top sun gear.

As with the other embodiments discussed above, pedestals 328 and 330 are supported by only slightly more than one-quarter of the interior surface of the cylindrical portion of the housing 312, leaving two large separated areas 338a, 338b of housing portion 312 open, and thereby providing the additional space for enlarged windows 350 and 352 and/or for facilitating C-clip assembly as previously explained.

I claim:

1. A differential assembly comprising:

a differential housing;

a pair of sun gears positioned in said housing for receiving a pair of respective axle ends for rotation therewith about a common axis;

only two combination gear sets supported in said housing, each set having two outer combination gears separated by a center combination gear, and each respective combination gear in each set being in meshing engagement with both a respective one of said sun gears and with at least one combination gear of its set, the meshing engagement of said sun and combination gears interconnecting said respective axle ends in a mutual driving relationship;

said combination gears of each set being alternately in meshing engagement with opposite ones of said sun gears so that said two outer combination gears of a first one of said sets are in mesh with a first one of said sun gears, while said center combination gear of said first set is in mesh with the second said sun gear and with both said outer combination gears of said first set; and said two outer combination gears of the second of said sets being in mesh with the second of said sun gears, while said center combination gear of said second set is in mesh with said first sun gear and with both said outer combination gears of said second set; and said sets of combination gears being supported in said housing circumferentially about the common axis of said sun gears and spaced from each other.

2. The differential assembly of claim 1 wherein said two sets of combination gears are supported in said housing at positions 180° apart.

3. The differential assembly of claim 1 wherein said sets of combination gears are supported in said housing with the axes of their respective gears aligned in parallel with said common axis of said sun gears.

4. The differential assembly of claim 3 wherein each combination gear of each said set is in mesh with another combination gear of its respective set at two separated areas which straddle the position where each said combination gear meshes with its respective sun gear.

5. The differential assembly of claim 3 further comprising:

a pair of pedestals fixed to said housing circumferentially about said common axis of the sun gears; and each said pedestal being configured to receive and support a respective one of said sets of combination gears.

6. The differential assembly of claim 5 wherein said pedestals are fixed to said housing at positions spaced 180° apart.

7. The differential assembly of claim 5 wherein the configuration of each said pedestal comprises a plurality of interconnected bores for receiving and supporting said combination gears.

8. The differential assembly of claim 5 wherein the configuration of each said pedestal comprises at least one pilot surface for facilitating assembly of said sun gears in said housing.

9. The differential assembly of claim 5 wherein said housing has a central portion in the general shape of a cylinder about said common axis of the sun gears; each said set has only one center combination gear; and each said pedestal is generally configured in the form of a truncated sector of said cylinder.

10. The differential assembly of claim 5 wherein said housing has a central portion generally shaped as a cylinder about said common axis of the sun gears; said pedestals are fixed to said cylindrical central portion in two predetermined areas spaced from each other by two separated areas; and said housing further comprises at least one window formed through said housing in at least one of said separated areas.

11. The differential assembly of claim 10 wherein the area of said window comprises a major portion of said one separated area.

12. The differential assembly of claim 1 wherein said two outer combination gears of each said gear set are separated by two center combination gears, said center combination gears being in mesh with each other as well as with a respective one of said outer combination gears, and each of said two center combination gears also being in mesh with a respective one of said sun gears.

* * * * *